March 18, 1952  A. POLLAK  2,590,035
TILTING-ARBOR SAW AND CRADLE SUSPENSION THEREFOR
Filed Sept. 10, 1947  4 Sheets-Sheet 1
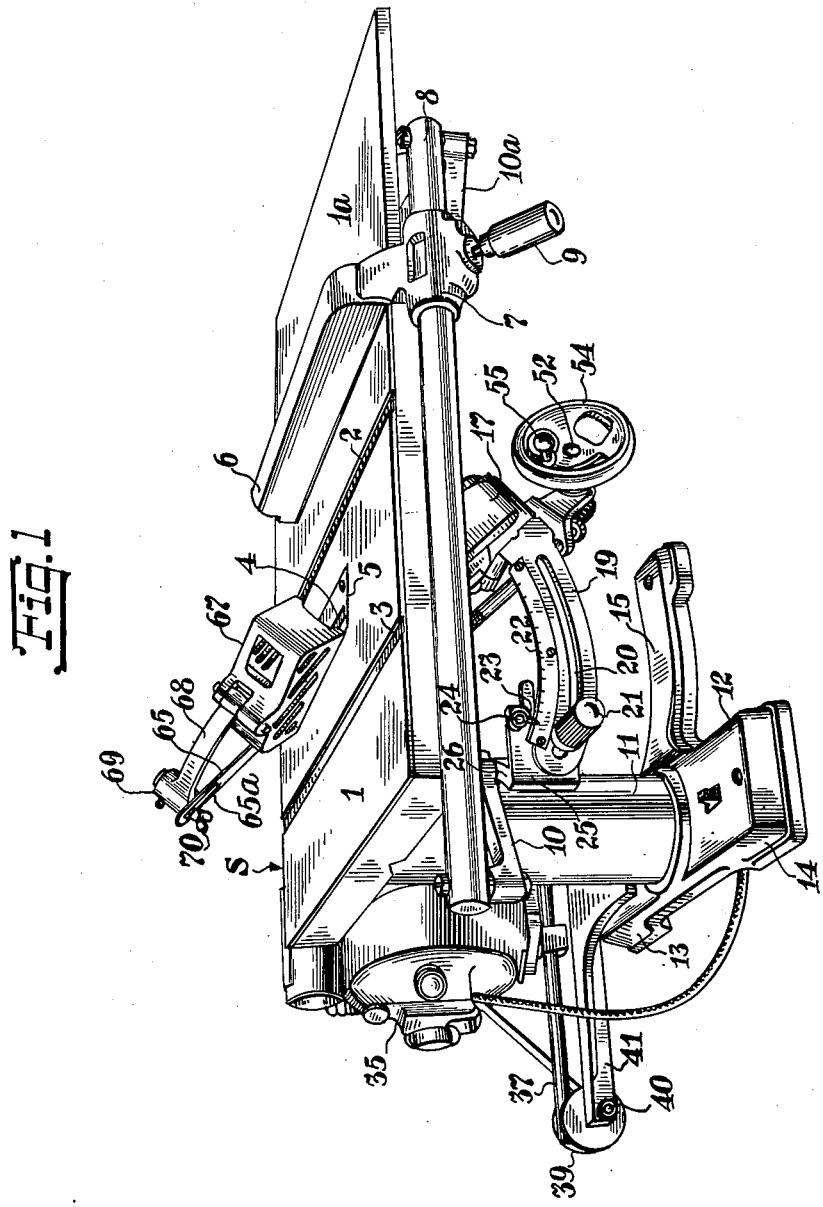
INVENTOR.
ABRAHAM POLLAK
BY
ATTORNEY March 18, 1952 A. POLLAK 2,590,035
TILTING-ARBOR SAW AND CRADLE SUSPENSION THEREFOR
Filed Sept. 10, 1947 4 Sheets-Sheet 2
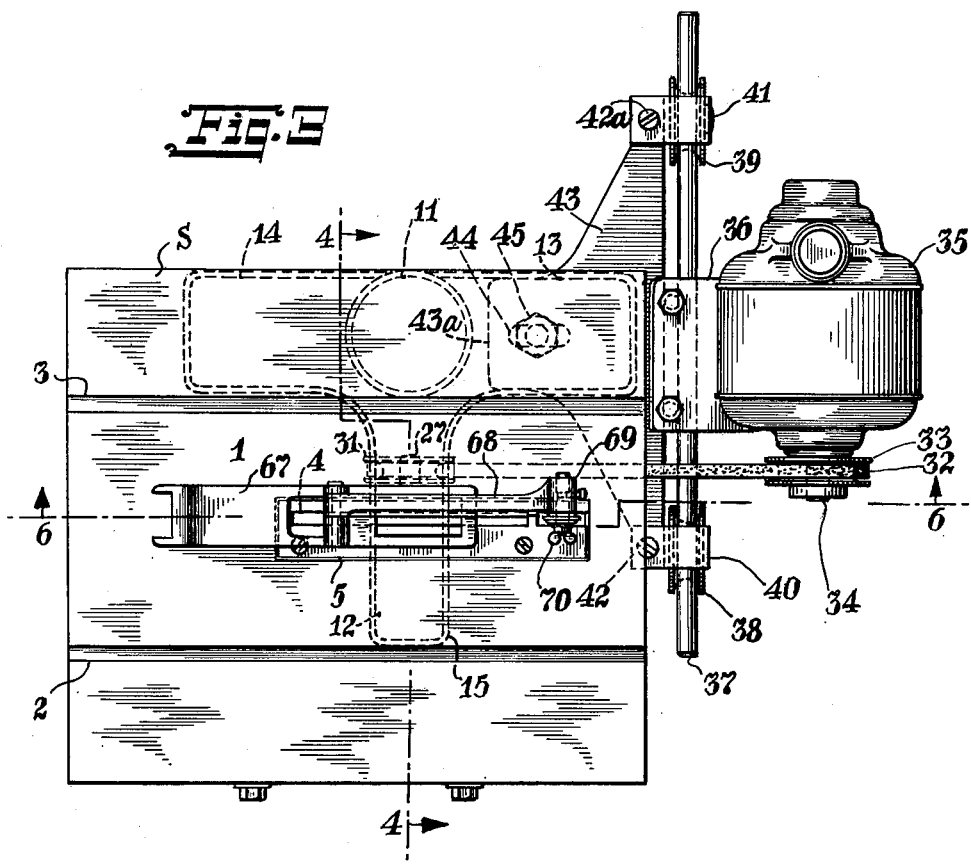
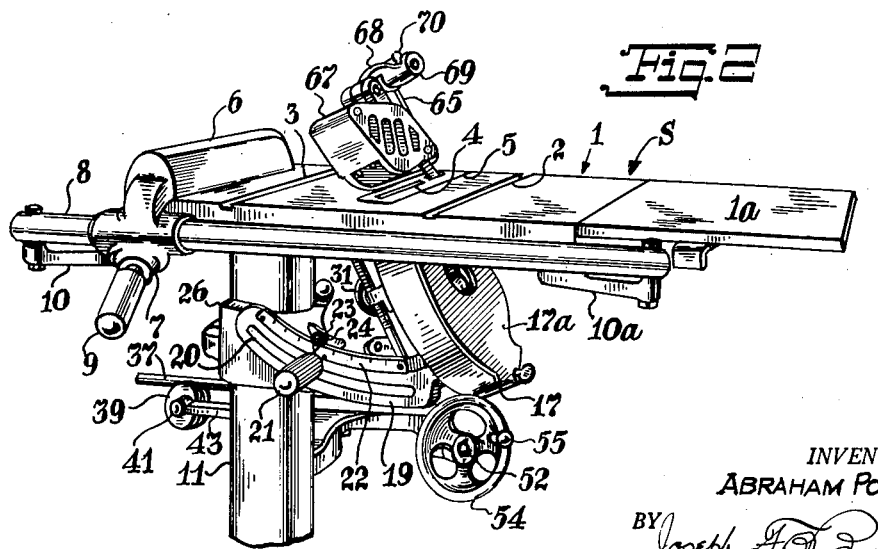
INVENTOR.
ABRAHAM POLLAK
BY
ATTORNEY

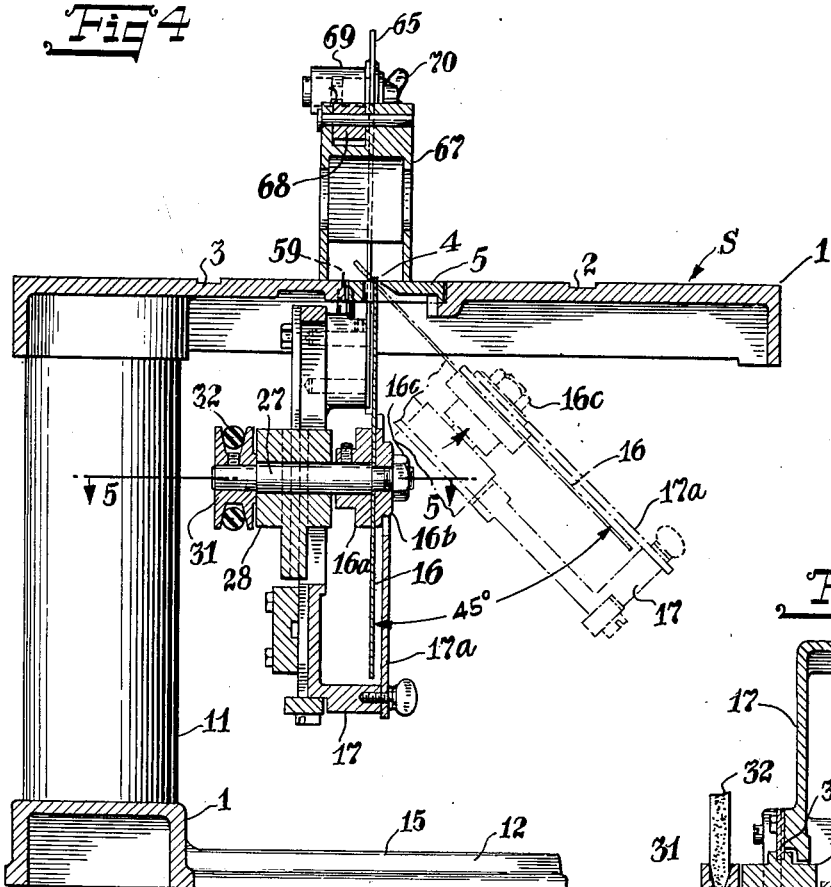
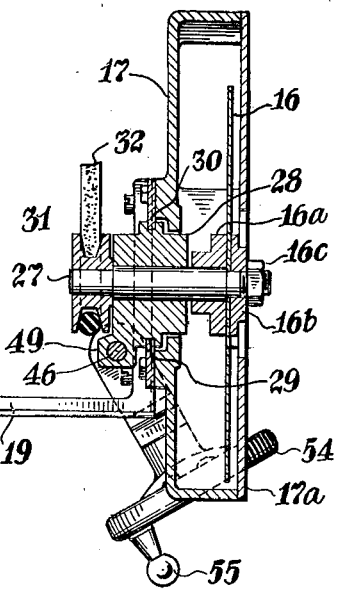

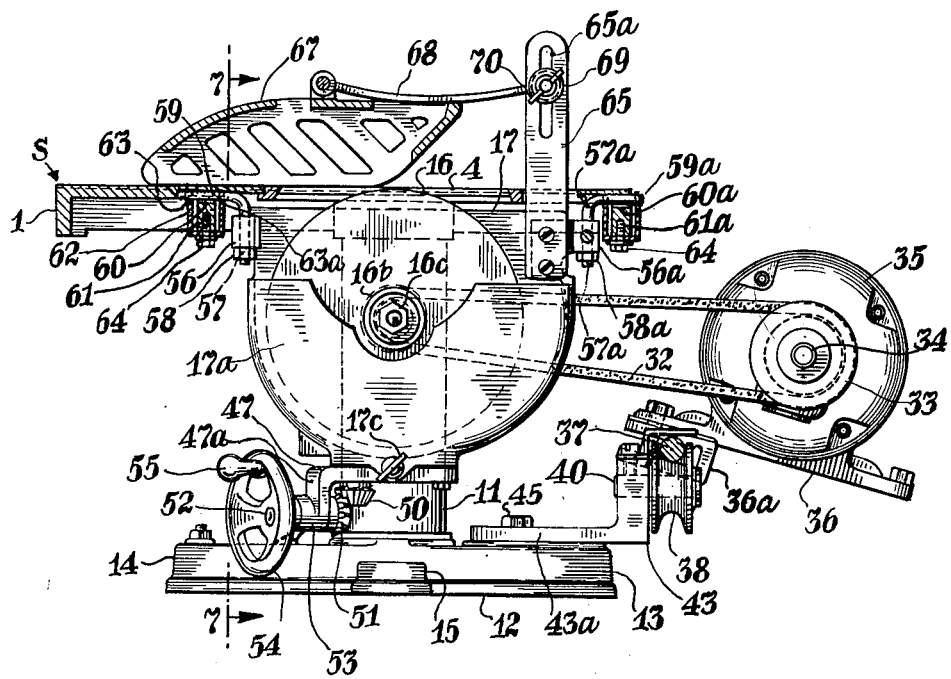
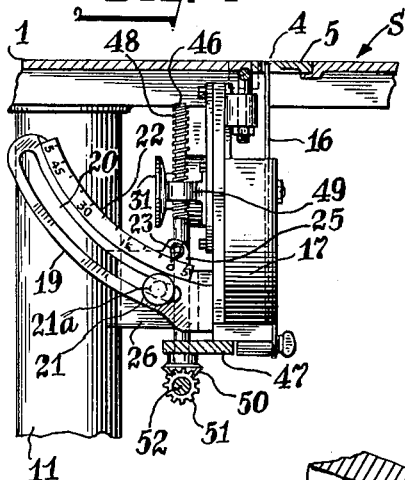
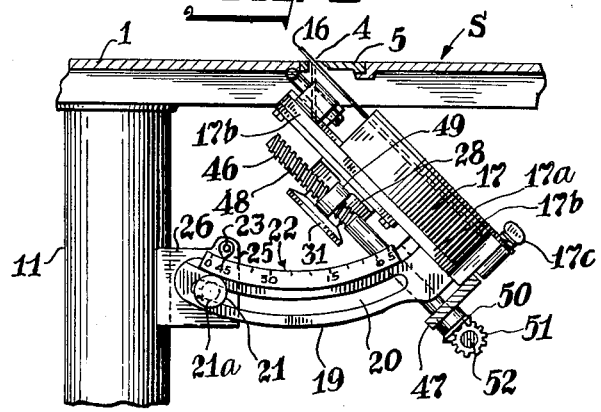
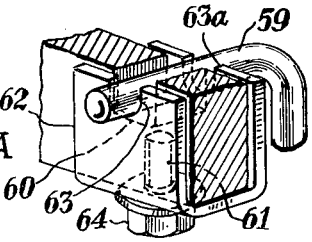

Patented Mar. 18, 1952

2,590,035

UNITED STATES PATENT OFFICE 2,590,035

TILTING-ARBOR SAW AND CRADLE SUSPENSION THEREFOR

Abraham Pollak, Linfield, Pa.

Application September 10, 1947, Serial No. 773,178

4 Claims. (Cl. 143—36)

This invention relates to improvements in tilting arbor saw and cradle suspension therefor.

In order to enable a saw of the tilting-arbor type to be properly operative, it is desirable to provide a saw window of a width of not to exceed ⅜ of an inch; that the saw blade be mounted in a suitable cradle and that the cradle be so mounted in relation to the plane or surface of the top of the table that the saw carried thereby will, during operation at 45° and 90° to the table top and at intermediate angular positions, intersect the plane of the table top at a common line coinciding with the median line of the saw window. Heretofore, in prior art practice, this has been generally accomplished by mounting the saw-blade in a cradle and by supporting and operatively mounting the saw cradle on fixedly-supported segments having arcs struck from the center of the saw window in the plane of the top surface of the table.

One of the objects of this invention is to produce a construction of the tilting-arbor type in which a saw cradle carrying a saw-blade may be mounted on a pivotal axis that will be positioned beneath the top surface of the saw table and that will, during operation at 45° and 90° to the table top and intermediate angular positions, cause the saw blade carried by the cradle to intersect the plane of the table top at a common line coinciding with the median line of the window, thus enabling, in such cradle-pivoted construction, the maintenance of the width of the saw window within proper limits and providing for proper operation of the saw at varying angles.

Another object of my invention is to provide for the retention of the saw at any desirable angular adjustment by the employment of an adjusting segment carried by the cradle and movable therewith to cooperate with a fixed indicator.

Still another object of my invention is to provide an arbor saw construction in which the table top is mounted on a tubular column preferably of cylindrical configuration, so that the same basic mechanism may be used for both floor and bench models by the use of a longer or shorter column.

Another object of my invention is to provide a construction in which the pivotal mounting of my cradle in the manner hereinabove specified may comprise cylindrical trunnions or pintles on the cradle which are mounted in bearings connected to the saw table beneath the top surface thereof at an axial position in parallel relationship to the median line of the saw window, but spaced therefrom and so arranged as to cause the aforesaid lines of intersection by the saw blade when positioned at 90° and 45° to cross at a common line coincident with the median line of the saw window.

Still another object of my invention is to provide a cradle-pivoted construction of the type specified in which the saw blade is carried in a plane parallel to the pivoted cradle, and said cradle is movable about the axis of an arc which is drawn tangent to two lines intersecting the plane of the table top at a common line coinciding with the median line of the saw-window and indicating the position of said saw-blade at both 90° and at 45° when said blade is extended through the saw window.

Another object of my invention is to provide a tilting-arbor construction of the type hereinabove specified in which the cradle for the saw blade will be U-shaped in conformation and the aforesaid pivotal mounting will comprise cylindrical trunnions or pintles mounted on the upper corners of said U-shaped cradle along an axis parallel with the saw window, and the saw blade will be carried in a plane parallel to the said pivoted cradle and to a vertical plane passing through said cradle and through the axis of said trunnions, said saw blade being carried by said cradle to planes which will cause said blade to intersect the plane of the table top in both 90° and 45° positions at a common line substantially coincident with the median line of the saw window.

Still another object of my invention is to greatly simplify the mechanism required for mounting a tilting arbor saw of the type specified and particularly to expose and make accessible the operating parts of such mechanism and to avoid the usual enclosing walls for such saw mounting mechanism.

Still another object of my invention is to arrange said saw blade and its mounting cradle in accordance with a geometric formula wherein lines are drawn to indicate the 90° and 45°, the extended planes of the positions of the saw blades intersecting each other at the plane of the table top at a common line coinciding with the median line of the saw-window, a circle is drawn having an arc with which said extended lines indicating 90° and 45° positions will be tangent and lines at right angles to each of the lines indicating 90° and 45° at the point of tangency will meet and provide a point beneath the table top representing an axis of suspension for the cradle.

The suspension of the cradle hereinabove specified may be carried out in accordance with the formula and proof set forth in Fig. 9 of the drawings.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a perspective view of a tilting-arbor saw constructed in accordance with my invention and mounted on a short column for support on a bench or other elevated support;

Fig. 2 is another perspective view in a different position of my tilting-arbor saw mounted on an elongated column and adapted to be supported on the floor and maintained in suitable elevated position;

Fig. 3 is a view in plan of the tilting-arbor saw shown in Figs. 1 and 2;

Fig. 4 is a section on the line 4—4 of Fig. 3 looking in the direction of the arrows, and showing in full lines my cradle and saw-blade in 90° position and in dotted lines showing the 45° position thereof;

Fig. 5 is a section on the line 5—5 of Fig. 4 looking in the direction of the arrows;

Fig. 6A is a perspective view of my adjustable mounting for the cradle pivot;

Fig. 6 is a section on the line 6—6 of Fig. 3;

Fig. 7 is a section on the line 7—7 of Fig. 6 looking in the direction of the arrows and showing the cradle suspended to position the saw-blade at 90° to the plane of the top surface of the table;

Fig. 8 is a section similar to Fig. 7 showing the cradle moved to its 45° position; and Fig. 9 (Sheet 3) is a geometric diagram and formula in accordance with which the cradle is suspended beneath the table top.

Referring now to these drawings, which illustrate a preferred form of my invention, S indicates a tilting-arbor saw embodying a table 1 of conventional type having in its top surface mitre gauge slots or grooves 2 and 3 and a saw window 4 arranged in parallel relationship thereto and, as shown, provided in a removable plate 5. As illustrated in Figs. 1 and 2 the table is provided with an extension leaf 1ᵃ suitably connected to one end thereof and is also provided with a rip-fence rail 6 which is movable along the surface of the table top and, as shown, is provided at the forward edge of the table with a bearing block 7 which is slidable along a cylindrical rod 8 and adapted to be fastened thereto by a hand-operated screw clamp 9. As illustrated, the rail 8 is supported at opposite ends by pivoted link members 10—10ᵃ having a pivotal supporting connection at their outer ends with the cylindrical guide member 8 and being suitably connected at their inner ends with the corners of the table 1. The table 1 is securely mounted at the upper end of a column 11 and projects at right angles thereto.

In Fig. 1 I have shown the lower end of the column mounted in a base member 12 provided, as shown, with a pair of laterally extending feet 13 and 14 and a centrally disposed forwardly projecting foot 15 so that the space beneath the projecting table 1 and the supporting feet is entirely free and unobstructed. A table-mounting for use on an elevated bench or the like is thus produced. In Fig. 2, an elongated column is used for mounting the table 1 in suitably elevated position from the floor.

In accordance with my invention, the saw blade 16 is mounted in a cradle 17 and the cradle is suspended from pivot elements positioned beneath the top surface of the saw table on an axis in parallel relationship to the saw window 4 and this suspension will, during operation of the saw-blade at 45° and 90° to the table top, cause said saw-blade to intersect the plane of the table top at a given line coincident with the median line of the window 4, while at intermediate positions between 45° and 90° the position of the saw-blade will be maintained within the standard width limits of the saw window. I am thus enabled in such cradle-suspended construction to maintain the width of the saw window within proper limits and to provide for proper operation of the saw at varying angles.

In order to enable retention or positioning of the saw-blade at any desirable angular adjustment, I fasten at the bottom of the cradle 17 a segmental arm 19 provided with a segmental guide slot 20 cooperating with and slidable along a screw-threaded guide pin 21ᵃ mounted in a knob or hand-clamp 21. The pin 21ᵃ is threaded into a tapped aperture in a stationary arm 25 of a fixed block 26 which is secured to the tubular column or post 11. The turning of the screw-threaded pin 21ᵃ by the knob or hand-clamp 21 will cause said hand-clamp 21 to press the segment against the arm 25 and will fasten the slotted segment in any desirable adjusted position. The adjusting segment 19 has along its top edge a segmental surface which is provided with an indicator scale 22 adapted, during the movement of the cradle and segment, to slide beneath and in cooperative relationship with the stationary indicating-finger or pointer 23 mounted on a screw 24 fastened to the arm 25.

As shown more particularly in Figs. 4 to 8, the saw-blade 16 is mounted on the cradle 17 by securely fastening the same through clamping members 16ᵃ—16ᵇ and nut 16ᶜ on a shaft 27 mounted within a shaft bearing on a carriage 28 which is slidably mounted on ways 29—30 adapted to permit the vertical sliding of the saw-blade in the cradle while retaining the bearing 28 and shaft 27 in proper positions relatively to said cradle 17.

The shaft 27 is provided with a grooved pulley 31 at the end opposite to that at which the saw-blade 16 is fastened. Pulley 31 preferably has a V-groove and is driven by a belt 32 from a drive pulley 33 on the shaft 34 of an electric motor 35. The motor 35 has a tangential base 36 and is mounted on a floating motor mount. As illustrated, a cylindrical motor-carrying rod 37 is mounted in grooved pulleys 38 and 39 supported on suitable shafts 40 and 41 mounted at opposite ends of a T-shaped mounting arm 43, having its central arm 43ᵃ in turn adjustably mounted through slot 44 and clamping screw 45 to the foot of the portion 13 of the base portion 12 of the machine. The motor carrying rod 37 is preferably held in the grooved pulleys 38 and 39 by straps 42, 42 connected to the arm 43 by screws 42ᵃ, 42ᵃ, and the base of the motor is mounted on a pair of mounting bars 36ᵃ (Fig. 6).

In the operation of this floating motor mount the motor will be caused to move automatically axially of its drive shaft in accordance with the swinging movement of the cradle, and will thus assist in retaining the belt in operative contact with the pulleys at all times during the swinging movement of the saw-carrying cradle 17, and because of this floating motor mount the tension applied between the drive and driven pulleys will enable axial movement of the motor to its proper position in relation to the pulley being driven, and, as above indicated, such axial movement will be accomplished automatically by the torque of the drive belt which is applied to the drive pulley of the motor by any variation of the alignment of the driving and driven pulleys during the operation of the saw-unit by the said motor through the said drive belt. A motor mount of this type also enables a motor fast on its carrying bar to take full advantage of the rotative reaction of the motor as well as its weight for the purpose of maintaining the driving belt between the driving pulley on the motor and the machine being driven in properly tightened condition at all times during the driving operation by the motor of the saw unit, and particularly said belt will be so maintained in such tightened condition as to cause any torque produced by the driven machine to be transmitted to the motor drive pulley and shaft and to result in an axial movement of the motor into proper alignment with the saw unit being driven thereby.

Suitable means is provided for moving or shifting vertically and adjusting the position of the bearing and shaft on which the saw-blade is mounted in order to permit projection of said blade to varying distances above the plane of the table top through the saw window, and for this purpose I mount a screw-shaft 46 in an angular bracket 47 securely fastened to the lower end of the said cradle 17. See Figs. 7 and 8. The screw-shaft 46 has at its upper end a screw-threaded portion 48 intermeshing with a tapped nut-member 49 on the shaft bearing 28, so that rotation of the screw 46 will cause an up-and-down movement in the ways 29 and 30 of the bearings 28 with the shaft and said blade. The shaft 46 is rotated by the turning of a bevel gear 50 fixed on the lower end thereof. The gear 50 meshes with a bevel gear 51 on a stub shaft 52 mounted in a bearing 53 which, as shown, is integral with an arm 47a of the angular bracket 47. The shaft 52 and gear 51 are rotated by a hand wheel 54 having a handle 55. The cradle 17 is preferably provided with a partial cover plate 17a which is fastened to the base member 17b by a thumb-screw 17c.

In the preferred form of my invention, the cradle 17 is mounted, as aforesaid, along a pivotal axis as hereinabove specified by forming the base casting of said cradle 17 in a substantially U-shaped conformation and providing at the upper corners of such U-shaped cradle a pair of vertically-disposed pivot-pin mounting-lugs 56—56a and mounting in said lugs angular pivot members 57—57a from which the cradle is suspended. As shown, vertical shank portions of the members 57—57a are screw-threaded and held in the lugs 56, 56a by nuts 58—58a and said members 57—57a have horizontally-projecting legs 59—59a. These horizontal legs 59—59a extend outwardly in a horizontal direction from the cradle base-plate and provide pivots for the cradle, which, in operative position, are aligned along an axis parallel to the saw window as hereinabove specified.

In the preferred embodiment of my invention, the pivot members 59—59a are passed through roughly machined apertures 60—60a in ribs 61, 61a, and I provide trunnion members 62—62a, each of channel-shaped conformation, and adapted to embrace one of the ribs 61—61a. See Fig. 6A. Said channel-shaped trunnion members are provided in upwardly-projecting flanges thereof with bearing notches 63—63a into which a horizontal pivot-portion of one of the angular pivot members 57, 57a is fitted, and each of these U-shaped trunnion members is fastened to one of the ribs 61—61a by bolts 64. This method of assembly allows for discrepancies of machining of the ribs and provides bearing notches in hardened steel members for the pivot members 59—59a. By this method of mounting, it will be observed that by removing the belt and loosening the clamp-knob 21 which holds the segment 19 the entire cradle assembly may be moved transversely for facile location transversely in the saw window and the cradle may be retained in this position by means of spacers or suitable washers on the screw-threaded pin 21a arranged beneath the said segment 19.

In the preferred form of my invention, I also fixedly mount on the cradle 17 at one side of the saw-blade an upwardly-projecting guard-mounting plate 65, which passes through a short slot 66 aligned or registering with the saw window and preferably formed in and extending through the removable window plate 5. Obviously this mounting plate 65 will have a tilting movement similar to the cradle and saw-blade and will provide a tilting movement for a guard head 67 mounted thereon that will be identical with the tilting movement of the saw-blade. As illustrated, the guard head 67 is pivotally mounted on the plate 65 by a link arm 68 which at one end is adjustably mounted in the arm 65 by the provision in said plate 65 of the slot 65a and the fastening of the link arm 68 in said slot by a spacing member 69 and wing nut 70.

It will be apparent that a standard mitre-guage, not shown, of any suitable design may be used in connection with the grooves in the upper surface of my tilting-arbor saw hereinabove specified.

It will be seen that the saw-blade may be positioned at any desirable angular adjustment by swinging the cradle about its pivotal axis hereinabove referred to and fastening the same in adjusted position by means of the slotted segment 19, and the securing thereof by the hand-actuated clamp or knob 21. It will also be seen that the pivotal mountings hereinabove specified comprise cylindrical trunnions on the cradle, which are mounted in bearings connected to the saw table beneath the top surface thereof at an axial position in parallel relationship to the median line of the saw window but spaced therefrom and so arranged as to cause the aforesaid intersection by the saw-blade when positioned at 90° or 45° on a common line coincident with the median line of the saw window, and that said saw-blades at both 90° and 45° to the surface of the table top will be positioned to extend tangentially to a circle having a radius equal to the distance from the axis of suspension to the median line of the blade, and also that the saw blade will be carried and the cradle will be mounted in accordance with the geometric formula wherein lines are drawn to indicate the 90° and 45°, the extended planes of the positions of the saw blades intersecting each other at the plane of the table top, a circle is drawn having an arc with which said extended lines indicating 90° and 45° positions will be tangent and lines at right angles to each of the lines indicating 90° and 45° at the point of tangency will meet and provide a point beneath the table-top representing an axis of suspension for the cradle. Accordingly, said axis of suspension of the cradle is preferably disposed substantially at the position of intersection of perpendiculars to an arc drawn in tangency to lines indicating the angular positions of the blade at 90° and 45°, respectively, to the table top when said blade is passed through the saw window at such angular positions and when such lines or planes intersect each other at a common line substantially coinciding with the median line of said saw window, and the cradle suspension specified will be carried out in accordance with the formula and proof set forth in Fig. 9 of the drawings. A line drawn from the point indicating said axis of suspension to the center line of the saw window will show that said axis of cradle suspension hereinabove described is disposed in an inclined plane extending from the center line of the saw window toward said cradle at an angle of 22½° to the plane of the table-top, and I have found that the positioning of such axis of pivotal suspension along this inclined plane of substantially 22½° to the plane of the table-top will cause the planes assumed by the blade (when it is moved in its planetary path to positions of 90° and 45°, respectively, to the table-top) to intersect each other and the plane of the table-top surface along a conjoint line. I have found, furthermore, that there is during said planetary movement very little "drift" or sidewise movement of the blade, that would otherwise require the saw window to be made wider than the width which is necessary for the purpose of enabling the blade in its passage through the saw window at 45° to clear the bottom and top surfaces of the table. This width depends, of course, on the thickness of the table and is necessarily present in all tilting arbor saws, see Fig. 8.

Operation of the device will be obvious from the above description.

Having described my invention, I claim:

1. A tilting arbor saw and cradle therefor comprising, in combination, a saw table having top and bottom surfaces and provided with a saw window, pivot members mounted below the bottom surface of the table at a selected side of the saw window and having a pivotal axis positioned in substantial parallelism with the longitudinal axis of said saw window and with the table-top surface, a saw cradle suspended from said pivot members to move concentrically about said pivotal axis, a saw arbor mounted to project from a side of the cradle into a position below said saw window, a saw blade mounted on said arbor and being movable in a planetary path of movement about said pivotal axis between planes of 90° and 45°, respectively, to the table-top surface, said pivotal axis being positioned in a plane extending from the center line of said saw window toward said selected side thereof and inclined at an angle to the table-top surface of approximately 22½° in which position of the pivotal axis said blade-planes of 90° and 45°, respectively, will intersect each other and also the plane of the table-top surface along a conjoint line, said saw arbor being arranged in the cradle at a sufficient distance below said pivotal axis to cause said arbor to be disposed beneath said bottom surface of the table when said cradle is moved into said plane of 45°, means for adjustably retaining the saw blade in varying positions between said 90° and 45° positions, means for raising and lowering the arbor in the cradle, and means for rotating said arbor.

2. A tilting arbor saw and cradle therefor comprising, in combination, a saw table having a table-top surface and provided with a saw window, pivot members mounted below the bottom surface of the table-top at a selected side of the saw window and having a pivotal axis positioned in substantial parallelism with the longitudinal axis of said saw window and with the table-top surface, a saw cradle suspended from said pivot members to move concentrically about said pivotal axis, a saw arbor mounted to project from the cradle into a position below said saw window, a saw blade mounted on said arbor and being movable in a planetary path of movement about said pivotal axis between planes of 90° and 45°, respectively, to said table-top surface, said pivotal axis being disposed in a fixed inclined plane extending from the center line of said saw window toward said selected side thereof at an angle of substantially 22½° to said plane of the table-top surface, said positioning of the pivotal axis causing the planes of 90° and 45°, respectively, to said table-top surface which are assumed by the blade in said planetary movement to intersect each other and also said plane of the table-top surface along a conjoint line, said saw window at the surface of the table-top having a narrow width and provided with side edges positioned in slightly spaced relationship from the adjacent side faces of said saw blade when the same is angled at 45° and extends through said saw window, said saw arbor being arranged in the cradle at a sufficient distance below said pivotal axis as to cause said arbor to be disposed beneath the lower surface of the table when said cradle is moved into tilted position at 45° to the table-top surface, means for raising and lowering the arbor in the cradle, means for adjustably retaining the saw blade in varying positions between said 90° and 45° positions, and means for rotating said arbor.

3. A tilting arbor saw and cradle therefor comprising, in combination, a saw table having a table-top surface provided with a saw window having fixed longitudinal edges, pivot members mounted below the bottom surface of the saw table and having a pivotal axis positioned in substantial parallelism with the longitudinal axis of said saw window at a selected side thereof and also in substantial parallelism with the table-top surface, a saw cradle suspended from said pivot members to move concentrically about said pivotal axis, a saw arbor mounted to project from a side of the cradle into a position below said saw window, a saw blade mounted on said arbor and movable in a planetary path of movement about said pivotal axis to planes in relation to the table-top surface of 90° and 45°, respectively, which planes pass through the saw window and substantially register with the axis thereof, the position of said pivotal axis being disposed in a fixed line along an inclined plane passing from the longitudinal axis of said slot downwardly toward said selected side of the axis of the window, said plane being at an angle to the plane of said table whereby a line through the pivotal axis and perpendicular to the plane of the saw will be the same distance from the axis of the saw window when said saw is tilted 45° as when said saw is at 90° to the plane of said table, and the saw arbor being arranged in the cradle at a distance below said pivotal axis which is sufficient to cause the same to be disposed beneath said lower surface of the table when said cradle is moved into its tilted position of 45° to the table top.

4. A tilting arbor saw and cradle therefor comprising, in combination, a saw table having a table-top surface provided with a saw window having fixed longitudinal edges, pivot members mounted below the bottom surface of the saw table and having a pivotal axis positioned in substantial parallelism with the longitudinal axis of said saw window at a selected side thereof and also in substantial parallelism with the table-top surface, a saw cradle suspended from said pivot members to move concentrically about said pivotal axis, a saw arbor mounted to project from a side of the cradle into a position below said saw window, a saw blade mounted on said arbor and movable in a planetary path of movement about said pivotal axis, said pivotal axis being disposed on a line which coincides with the point of intersection of perpendiculars to a common arc drawn in tangency to lines indicating the two angular plane positions relatively to the table-top of the saw blade when the same is positioned at 90° and 45°, respectively, in a plane projection from the direction of the pivotal axis, and the saw arbor being arranged in the cradle at a distance below said pivotal axis which is sufficient to cause the same to be disposed beneath said lower surface of the table when said cradle is moved into its tilted position of 45° to the table-top.

ABRAHAM POLLAK.

REFERENCES CITED

The following references are of record in the file of this patent:

UNITED STATES PATENTS

| Number | Name | Date |
| --- | --- | --- |
| 210,100 | Connell | Nov. 19, 1878 |
| 366,633 | Mackintosh | July 12, 1887 |
| 1,506,154 | Berthelsen et al. | Aug. 26, 1924 |
| 1,723,077 | Richards | Aug. 6, 1929 |
| 1,816,069 | Bennett | July 28, 1931 |
| 1,988,102 | Woodward | Jan. 15, 1935 |
| 2,121,069 | Collins | June 21, 1938 |
| 2,261,696 | Ocenasek | Nov. 4, 1941 |
| 2,292,872 | Eastman | Aug. 11, 1942 |
| 2,329,902 | Hillenbrand | Sept. 21, 1943 |